US005658078A

United States Patent [19]
Cawley

[11] Patent Number: 5,658,078
[45] Date of Patent: Aug. 19, 1997

[54] GANTRY ROBOT CONNECTOR AND PROTECTION APPARATUS

[75] Inventor: Wesley Don Cawley, Port Neches, Tex.

[73] Assignee: Sage Automation, Inc., Beaumont, Tex.

[21] Appl. No.: 595,160

[22] Filed: Feb. 1, 1996

[51] Int. Cl.⁶ .................................................. F16C 29/12
[52] U.S. Cl. ............................ 384/7; 384/38; 384/45
[58] Field of Search .......................... 384/7, 45, 38, 384/44, 43, 15

[56] References Cited

U.S. PATENT DOCUMENTS 5,388,913  2/1995  Cawley et al. .
5,575,318  11/1996  Susnjara ................................. 384/42

OTHER PUBLICATIONS

THK Catalogue 1995, pp. 24, 168–169.

*Primary Examiner*—Lenard A. Footland
*Attorney, Agent, or Firm*—Fulbright & Jaworski

[57] ABSTRACT

A gantry robot protection apparatus for protecting the bearings of a gantry robot from contamination.

4 Claims, 8 Drawing Sheets

GANTRY ROBOT CONNECTOR AND PROTECTION APPARATUS

BACKGROUND OF THE INVENTION

Gantry robots of various types are known in fie prior art. Gantry robots generally comprise an apparatus mounted movably on at least one rail. Gantry robots often operate along three axes.

Types of gantry robots include open gantry robots and closed gantry robots. Open gantry robots are cantilevered. Closed gantry robots are supported between two generally symmetrical support members.

Linear bearings are often used to support and to provide the motion of gantry robots. A linear bearing generally comprises a block, a rail, and bearings contained in races. The block, bearings, and races travel along the rail.

Linear bearings are very rigid and precise. As a result, it is desirable to keep very clean the bearings. Air borne contamination, such as talc, carbon black, dirt, and graphite powder can damage linear bearings. Because the bearings are exposed to the rail, which is often coated with grease from contact with the lubricated bearings, any contamination of the rail will ultimately contaminate the bearings.

Also because linear bearings are very rigid and precise it is desirable to minimize stress due to mounting errors. For example, the surfaces upon which blocks and nails are placed may contain numerous variations. Similarly, the rails may not be completely straight or parallel. Such mounting errors stress the rigid and precise bearings as they travel along the rail and cause the bearings, over time, to fail.

SUMMARY OF THE INVENTION

To achieve the foregoing objects there is provided a gantry robot comprising a linear bearing assembly including a block, a rail, and a plurality of bearings, the rail having a travel length; a linear bearing assembly housing, the housing defining a travel gap along the travel length of the rail; a mechanical platform; connection means connecting the mechanical platform to the block through the travel gap; and flexible gasketing means adhered to the housing, the gasketing means slidably contacting the connection means and gasketing the travel gap. The connection means may comprise a flexible material. The gasketing means may be rubber. The gasketing means may be a brush. The connection means may slidably connect the mechanical platform to the block. The gasketing means may be adhered to each of two edges of the housing defining the travel gap. The flexible material may be bendable. The flexible material may have a deflection of at least 5°. The flexible material may comprise a metal strip. The connection means may have a floating shield adhered to its perimeter.

Also to achieve the foregoing objects there is provided a gantry robot comprising: a linear bearing assembly including a block, a rail, and a plurality of bearings, the rail having a travel length; a flexible belt placed over the linear bearing assembly along the travel length of the rail, the belt having an edge parallel to the rail; support means extending from the linear bearing assembly beyond the edge of the protective belt; and a platform mounted to the support means. The mechanical platform may comprise a second linear bearing assembly.

Also to achieve the foregoing objects there is provided a gantry robot comprising first and second parallel linear bearing assemblies, each including a block, a rail, and a plurality of bearings, the rails having a travel length; a flexible belt placed over the linear bearing assemblies, the belt outer having edges parallel to the rails; support means extending from each of the linear bearing assemblies and beyond the outer edges of the belt; and a mechanical platform mounted to the support means. The mechanical platform may comprise third and fourth parallel linear bearing assemblies perpendicular to the rails of the first and second linear bearing assemblies.

Also to achieve the foregoing objects there is provided a gantry robot comprising a linear bearing assembly including a block, a rail, and a plurality of bearings, the rail having a travel length; a mechanical platform; and bendable connection means connecting the mechanical platform to the block. The bendable connection means may have a deflection of at least 5°. The connection means may slidably connect the mechanical platform to the block. A floating shield may be adhered to the perimeter of the connection means. The gantry robot may further comprise a flexible linear bearing assembly housing, the housing defining a travel gap; and wear strips extending from the housing and flexibly contacting each other across the travel gap.

Also to achieve the foregoing objects there is provided a gantry robot comprising a linear bearing assembly including a block, a rail, and a plurality of bearings, the rail having a length; a mechanical platform; and connection means slidably connecting the mechanical platform to the block. The connection means and the mechanical platform may comprise a mounting bolt. A floating shield may be adhered to the perimeter of the connection means. The gantry robot may further comprise a flexible linear bearing assembly housing, the housing defining a travel gap; and wear strips extending from the housing and flexibly contacting each other across the travel gap.

DETAILED DESCRIPTION OF THE INVENTION AND PREFERRED EMBODIMENTS

Figure 1:
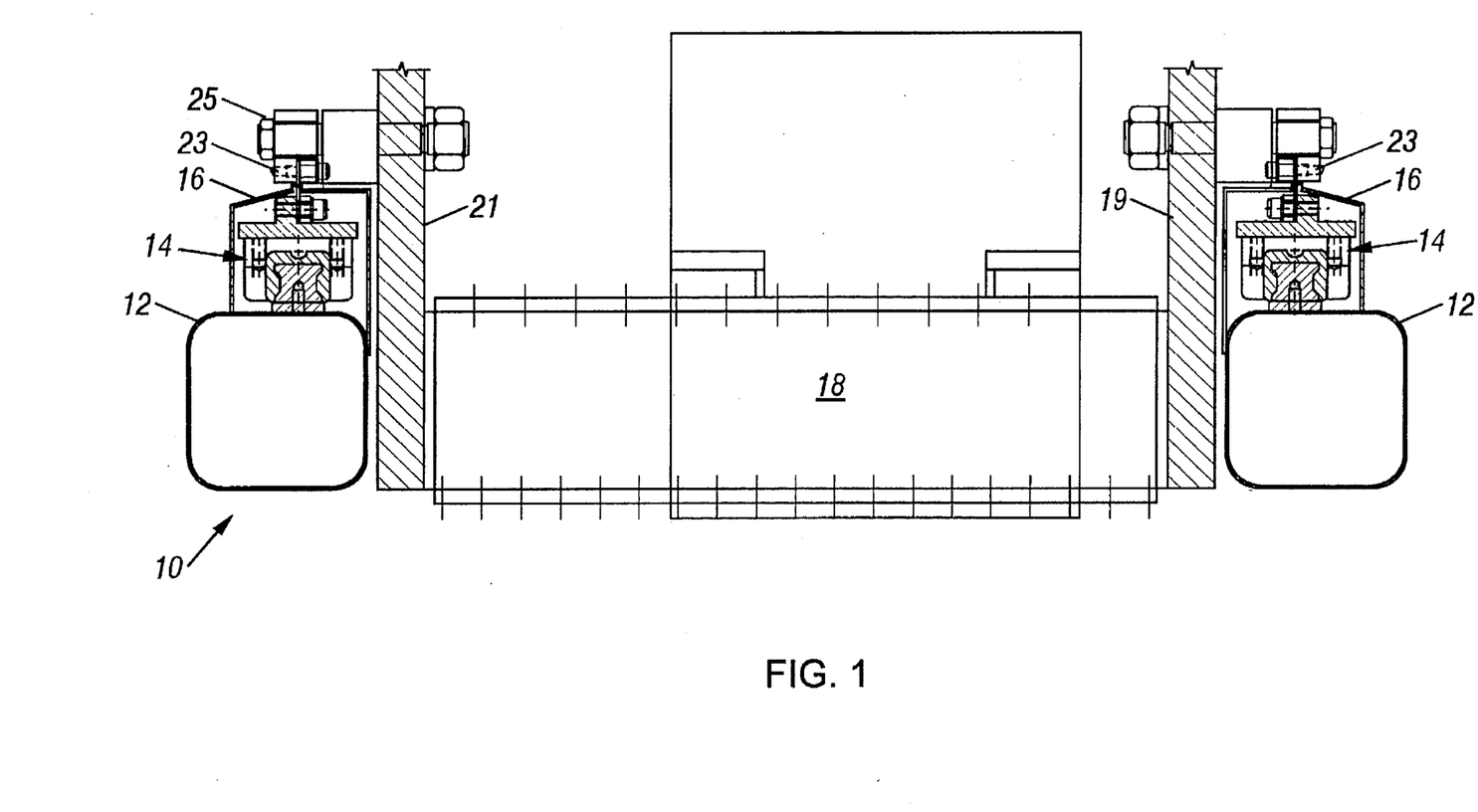
FIG. 1 depicts a cross-sectional view of a closed gantry robot.

FIG. 1 depicts a cross-sectional view of a closed gantry robot 10. The closed gantry robot 10 has beams 12, linear bearing assemblies 14, linear bearing assembly housings 16, carriage 18, arms 19 and 21, connectors 23, and holding nut 25.

Figure 2:
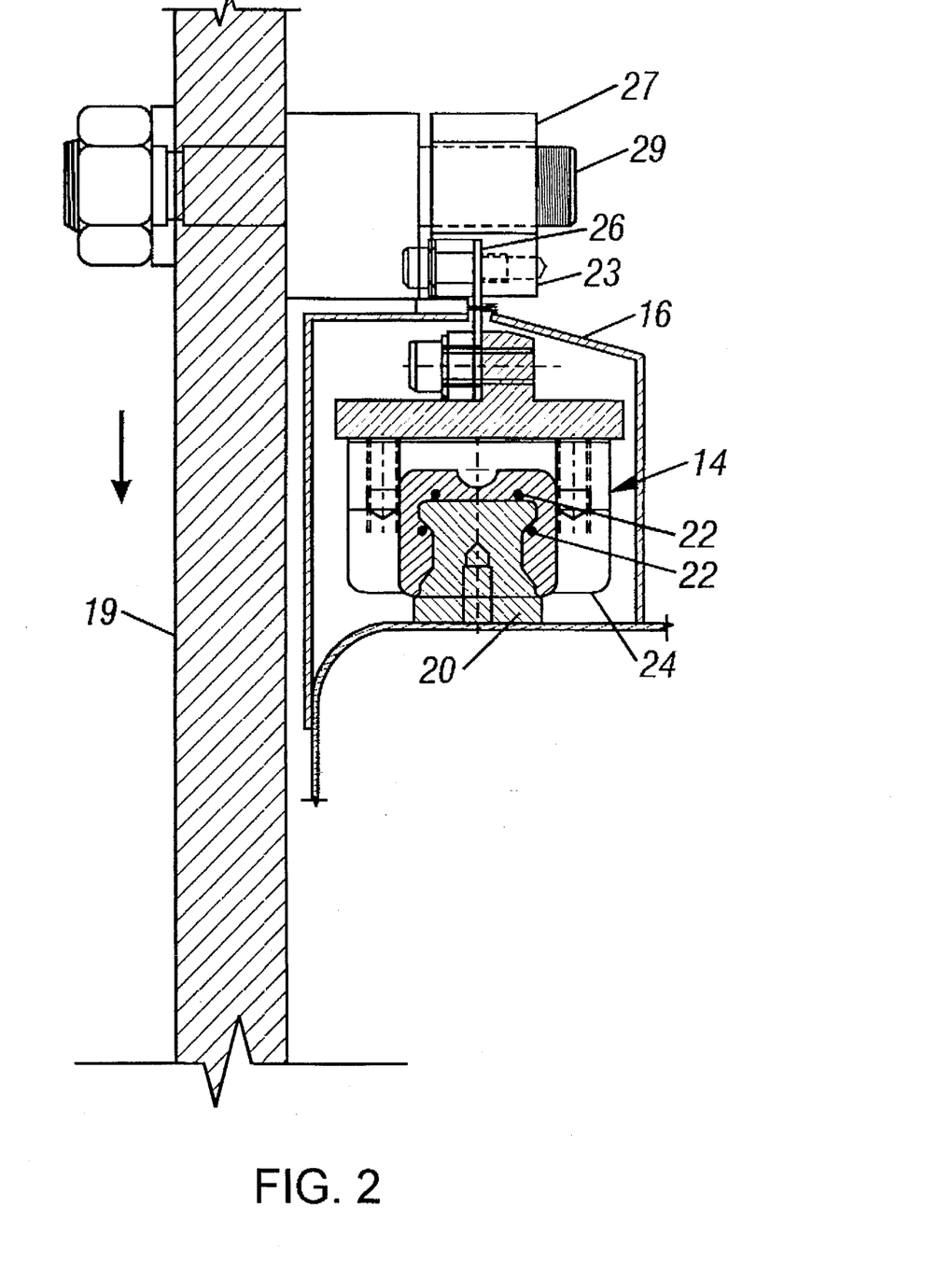
FIG. 2 depicts a cross-sectional view of a linear bearing assembly of the gantry robot depicted in FIG. 1.

FIG. 2 depicts an enlarged view of the housing 16 and linear bearing assembly 14 from FIG. 1 which are attached to arm 19. The linear bearing assembly 14 includes a rail 20, bearings 22 and block 24. A working load is borne in the direction of the arrow. The working load is transferred to the block 24 by arm 19 via connector 23. Connector 23 comprises a thin metal strip 26 and support member 27. Support member 27 receives mounting bolt 29. Mounting bolt 29 of arm 19 does not have a holding nut, such as holding nut 25 of arm 21, and is smooth where in contact with support member 27. Thus, support member 27, and connector 23, are free to slide linearly along the length of mounting bolt 29. Such movement allows the carriage 18 and the block 24 to move relative to each other to relieve stress due to mounting error. The housing 16 extends the length of the rail 20.

Figure 3:
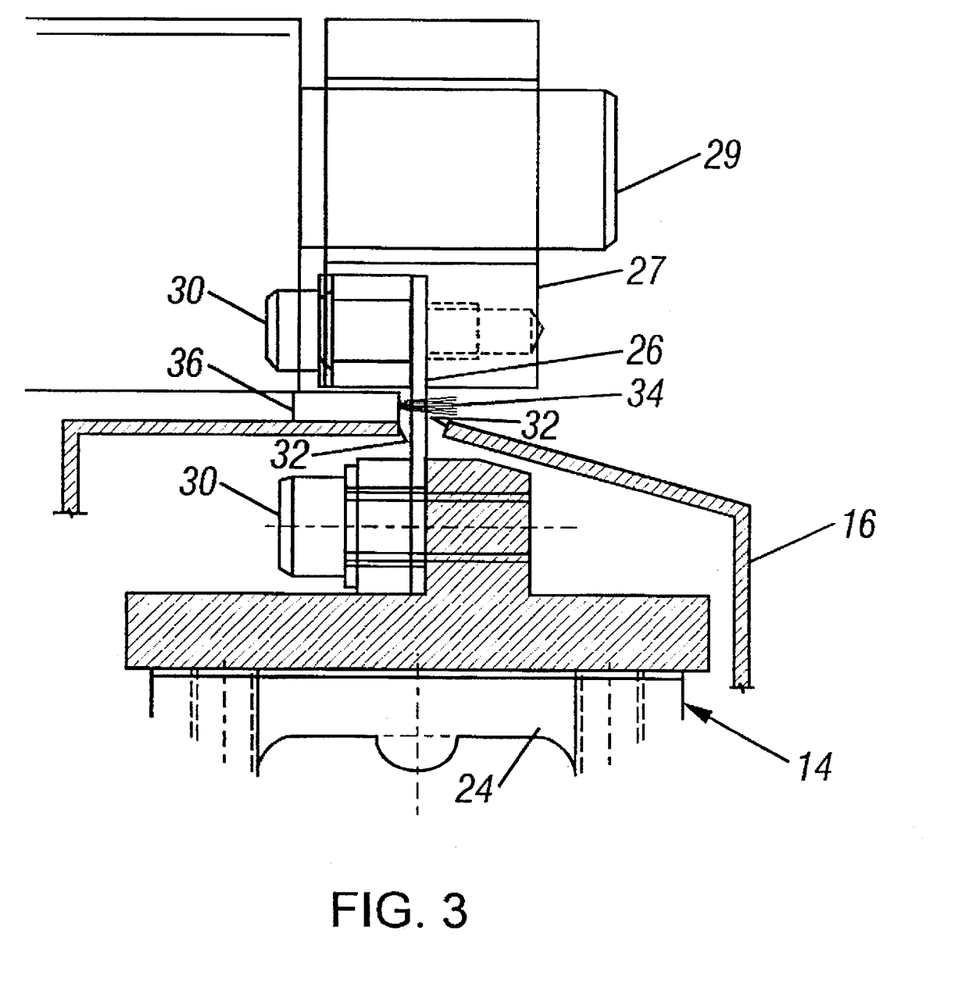
FIG. 3 depicts an enlarged view of FIG. 2.

FIG. 3 depicts an enlarged view of FIG. 2. Metal strip 26 is secured to the support member 27 and to the block 24 by bolts 30. Housing 16 defines a gap 32 through which the metal strip 26 can pass as the block 24 travels along the length of the rail 20.

Metal strip 26 has a very narrow width extending between the portions of housing 16 that define gap 32, and a relatively long length extending parallel to the length of the rail 20. Though metal strip 26 is very narrow, the length of the metal strip 26 causes metal strip 26 to have sufficient horizontal surface area to support the load of the carriage 18.

The narrow width of the metal strip 26 makes it possible to almost enclose the rail 20 and linear bearing assembly 14 within housing 16 by minimizing the width of the gap 32. As the width of the metal strip 26 becomes more narrow, the gap 32 may become more narrow.

The narrow width of the metal strip 26 also makes it possible for the metal strip 26 to deflect in response to mounting errors as the block 24 travels along the length of the rail 20. In particular, the metal strip 26 will deflect in response to angular mounting errors. The metal strip 26 may be made of spring steel.

The gap 32 may be protected by a flexible gasketing means that is temporarily displaced by the metal strip 26 as it travels along the gap 32. In FIG. 3, a brush 34 is crimped into a metal sleeve 36. The brush 34 and the metal sleeve 36 are displaced along the length of the rail 20 so that the brush 32 covers the gap 32 along the length of the rail 20. The metal strip 26 temporarily displaces the brush 34 at the point of contract between the brush 32 and the metal strip 26. The brush 34 may be attached to the housing by any means known to those skilled in the art, including without limitation gluing, bolting, and crimping.

Figure 4:
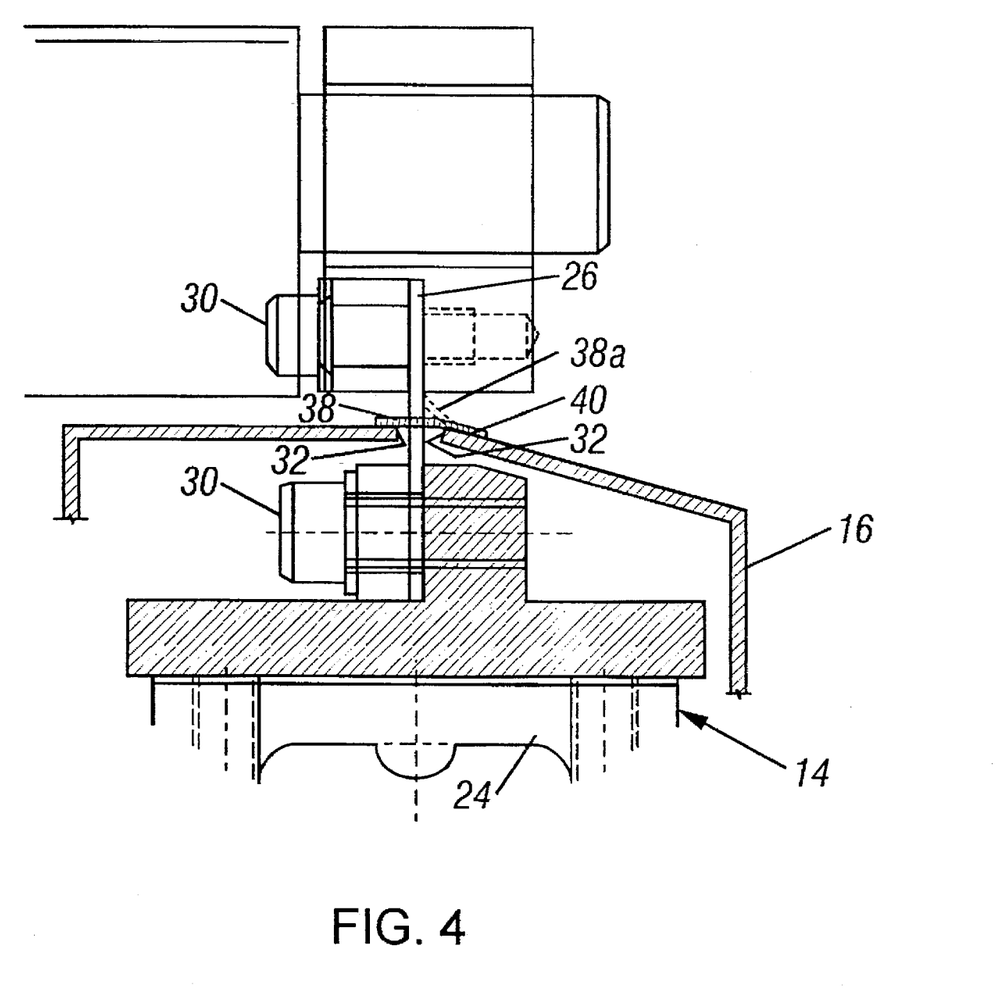
FIG. 4 depicts an alternative embodiment of the linear bearing assembly depicted in FIG. 3.

FIG. 4 depicts an alternative embodiment of the gasketing means depicted in FIG. 3. In FIG. 4, a rubber strip 38 is adhered to housing 16 along the length of the rail 20 at the location designated 40, such that the rubber strip covers the gap 32 along the length of the rail 20. The metal strip 26 temporarily displaces the rubber strip 38 at the point of contact between the rubber strip 38 and the metal strip 26, displacing the rubber strip 38 upward, as indicated by 38a.

Figure 5:
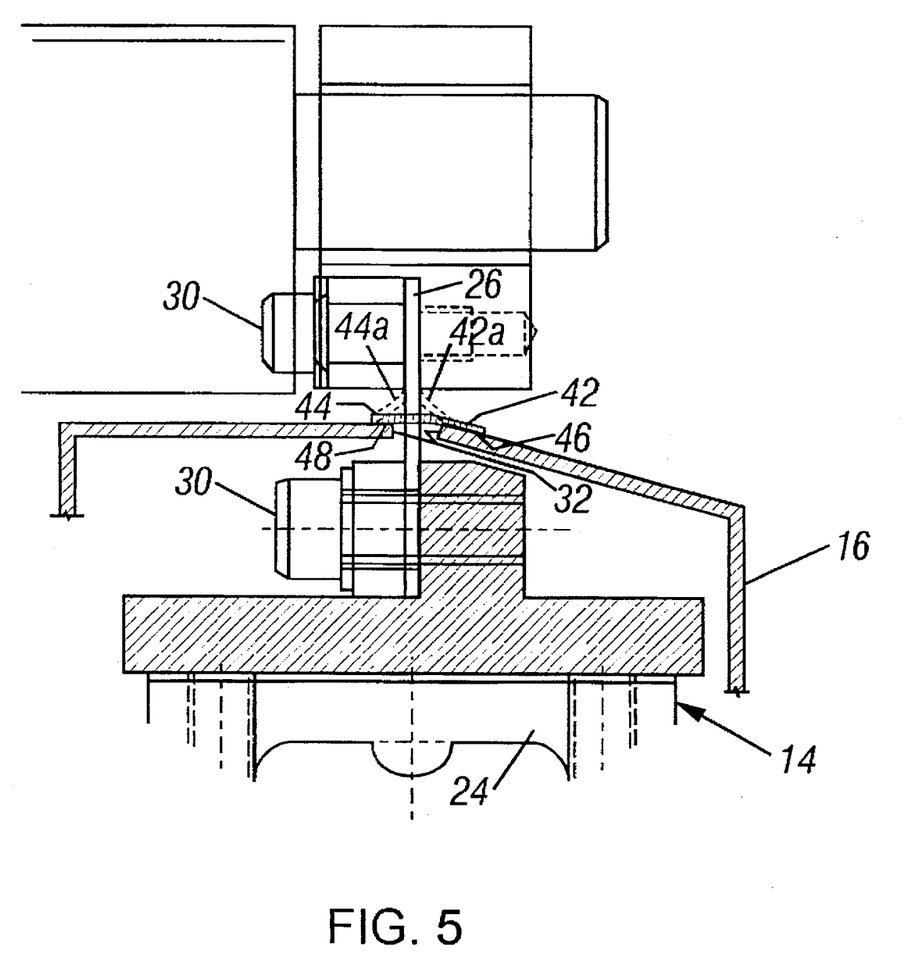
FIG. 5 depicts an alternative embodiment of the linear bearing assembly depicted in FIG. 3.

FIG. 5 depicts another alternative embodiment of the gasketing means depicted in FIG. 3. In the embodiments depicted in FIGS. 3 and 4, the gap 32 is exposed at the location of the metal strip 26 opposite the point of attachment of the gasketing means to the housing 16. As such gasket lug means is displaced by the metal strip 26, it cannot cover the gap 32 opposite the point of attachment of the gasketing means to the housing 16. The gasketing means depicted in FIG. 5 provides coverage of the gap 32 at all points along the length of the rail 20.

In FIG. 5, dual rubber strips 42 and 44 are adhered to the housing 16 along the length of the rail 20 at points 46 and 48. The rubber strips 42 and 44 are of such width that, when not displaced by the passage of the metal strip 26, they meet to cover the gap 32 along the length of the rail 20. When displaced by the passage of the metal strip 26 through the gap 32, the rubber strips 46 and 48 are upwardly displaced by the metal strip 26 as indicated by 42a and 44a. In such a configuration, the rubber strips 42 and 44 effect a seal on both sides of the metal strip 26, substantially sealing the housing 16 at all points along the length of the rail, including the location of the metal strip 26.

Figure 6:
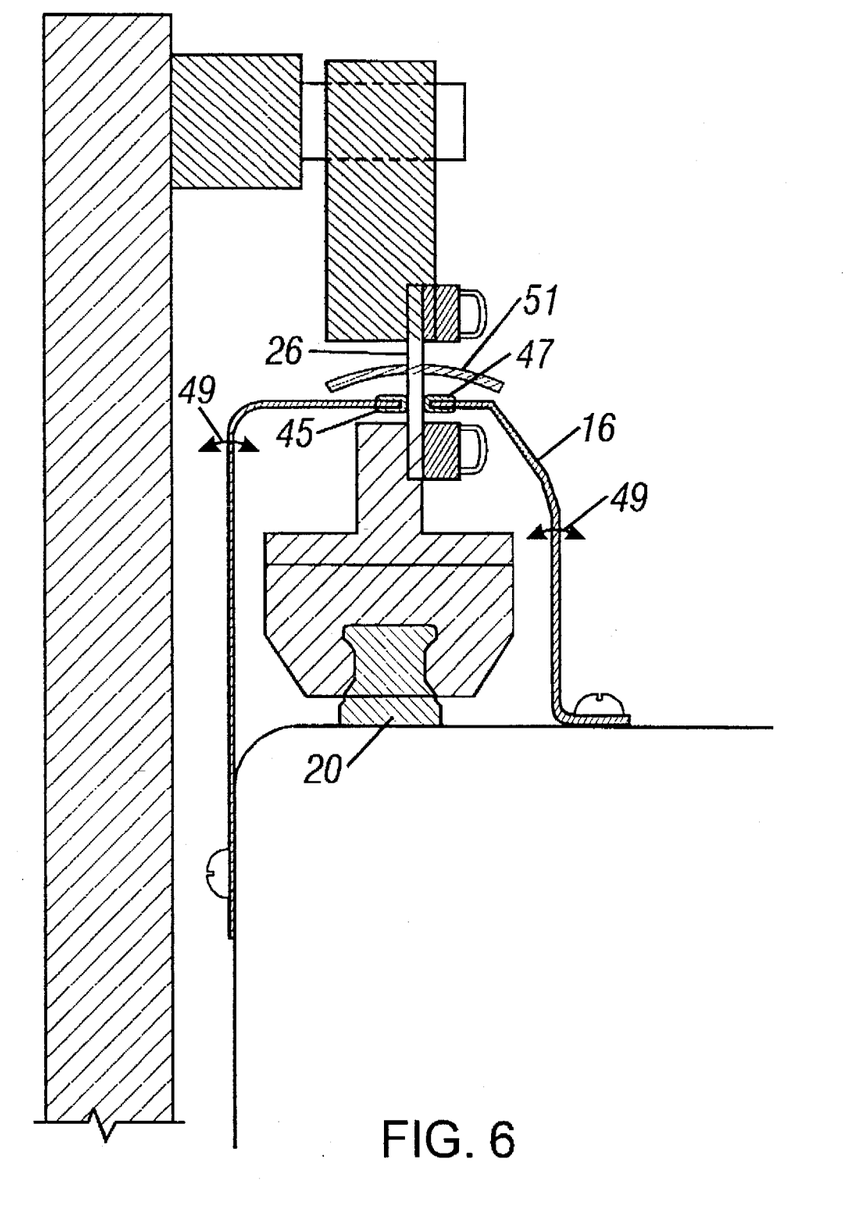
FIG. 6 depicts an alternative embodiment of the linear bearing assembly depicted in FIG. 3.
Figure 7:
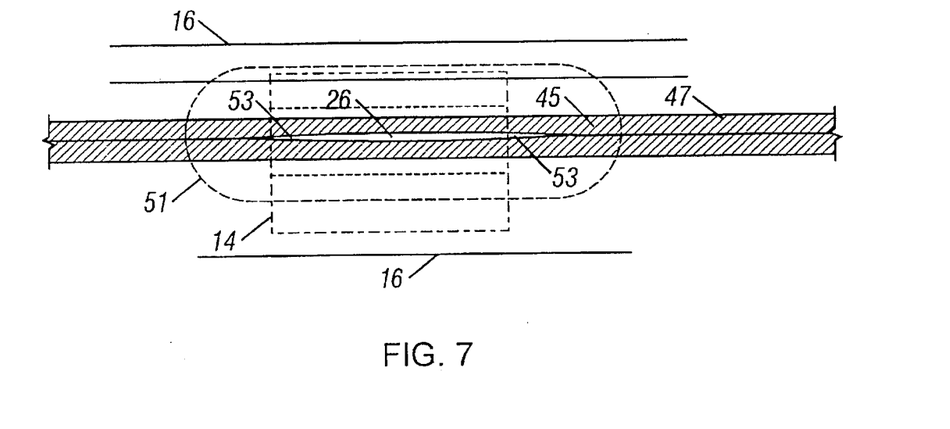
FIG. 7 depicts a phantom top view of the linear bearing assembly depicted in FIG. 6.

FIGS. 6 and 7 depicts another alternative embodiment of the claimed invention. In FIG. 6, wear strips 45 and 47 are adhered to the edges of the housing 16 that define the gap 32. Wear strips 45 and 47, and housing 16, are constructed such that the wear strips 45 and 47 meet along the length of the rail 20 and cover the gap 32, except where separated by the metal strip 26. As the metal strip 26 travels along the rail 20, the housing 16 flexes, as indicated by arrows 49, where the metal strip 26 is in contact with the wear strips 45 and 47. The flexing of the housing 16 allows the wear strips 45 and 47 to separate to allow passage of the metal strip 26. The wear strips may be made of any suitable wear material, such as plastic or rubber.

FIGS. 6 and 7 depict a floating shield 51. The floating shield 51 is sealingly adhered to the perimeter of metal strip 26. The floating shield 51 covers the short gaps 53 created where the metal strip 26 separates the wear strips 45 and 47. The floating shield 51 may be adhered to any connection means and may be used in any embodiment of the invention that results in short gaps in the gasketing means caused by passage of the connection means along the rail 20. In particular, the floating shield 51 may be used in any of the embodiments depicted in FIGS. 2–7.

Any suitable flexible gasketing means known to those skilled in the art may be employed in the foregoing configurations, including without limitation, plastic, rubber, brushes, and cloth. The invention is useful without regard to the specific type of bearings, as long as the bearings are sensitive to air borne contamination. Similarly, the gasketing means are useful without regard to the connection means connecting the bearing assembly to the mechanical platform through the travel gap. While the connection means may be metal strip 26, any connection means known to those skilled in the art may be used. The connection means may comprise flexible material that deflects in response to mounting errors. It is preferred that such flexible material be bendable, as opposed to jointed, to eliminate mechanical complexity. It is still further preferred that such flexible material withstand deflection of at least 5%.

Figure 8:
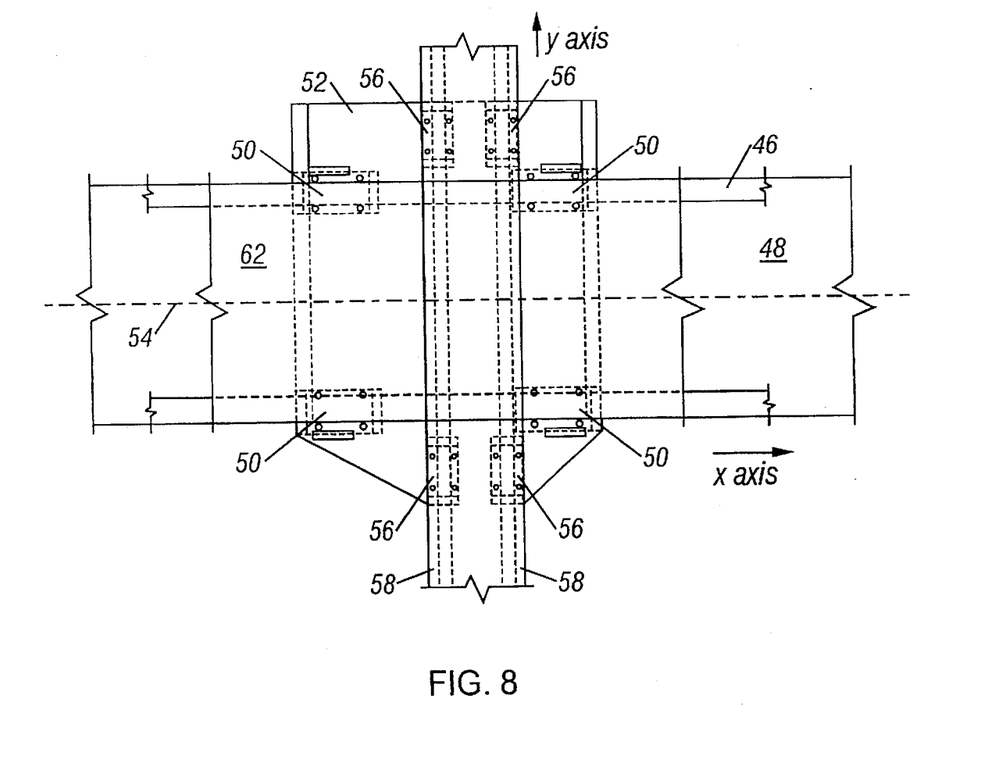
FIG. 8 depicts a phantom top view of a linear bearing assembly of a gantry robot.
Figure 9:
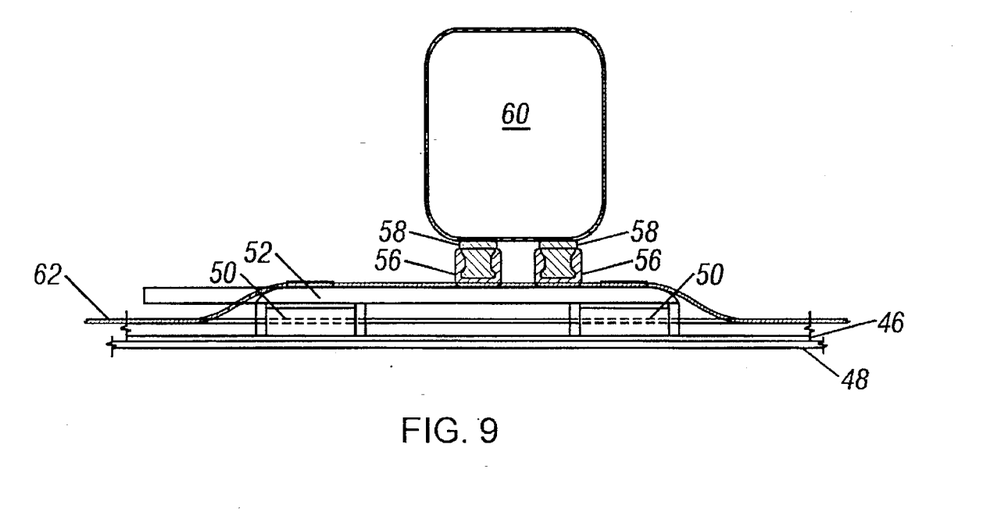
FIG. 9 depicts a cross-sectional side view of the linear bearing assembly of FIG. 8.
Figure 10:
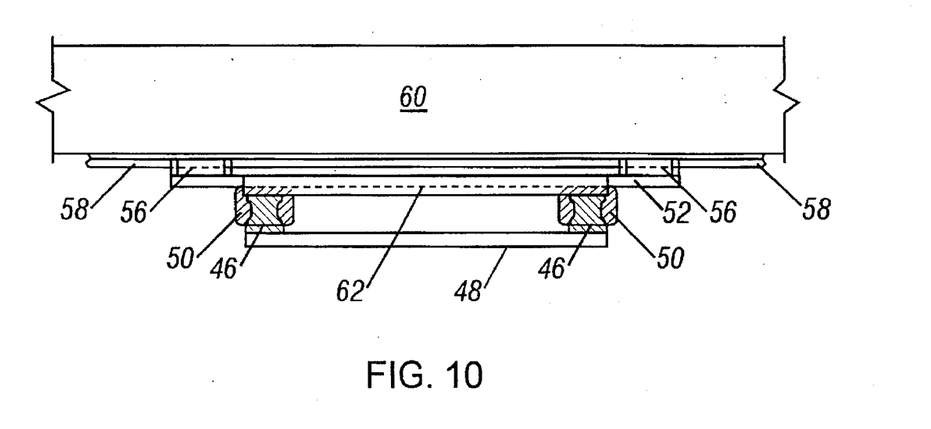
FIG. 10 depicts a cross-sectional front view of the linear bearing assembly of FIG. 8.

Another embodiment of the invention is depicted in FIGS. 8–10. FIG. 8 is a top phantom view of a two-axes, open gantry robot. The x axis and y axis shall be described in the manner indicated by the arrows in FIG. 8. FIG. 9 is a cross-sectional side view of the x axis depicted in FIG. 8. FIG. 10 is a cross-sectional side view of the y axis depicted in FIG. 8.

In the gantry robot depicted in FIGS. 8–10, rails 46 are mounted to a beam 48. Blocks 50, each having a plurality of bearings disposed in races, are mounted to the rails. A support plate 52 is attached to the top of the blocks 50. The support plate extends beyond the location of the rails 46, relative to a centerline 54. The blocks 50 and plate 52 travels along the x axis along the rails 46.

Blocks 56 are attached to the top portion of the plate 52, such that the blocks 56 straddle the blocks 50 relative to the centerline 54. To the blocks 56 are movably mounted rails 58. Beam 60 is mounted to the top of the rails 58. Rails 58 and beam 60 travels along the y axis through blocks 56.

To protect the bearings of blocks 50, the invention provides for a flexible belt 62. The belt 62 is placed over the beam 48 so as to cover the length of the rails 46. Because plate 52 and blocks 56 straddle the blocks 50 relative to the centerline 54, the belt 62 rides over and is lifted by plate 52 as plate 52 and blocks 50 travel along rails 46. Such is best illustrated by FIG. 9.

The embodiment of the invention illustrated in FIGS. 8–10 may be employed in any gantry robot having bearings sensitive to contamination. The foregoing embodiment does not require multiple or parallel blocks. Nor does the foregoing embodiment require any specific platform above the block or any specific means for connecting the platform to the block. The belt may be used over a single or a multiple bearing assembly that is straddled by any platform mounted to support means relative to the bearing assembly.

I claim:

1. A gantry robot comprising:

a linear bearing assembly including a block, a rail, and a plurality of bearings, the rail having a travel length;

a flexible belt placed over the linear bearing assembly along the travel length of the rail, the belt having an edge parallel to the rail;

support means extending from the linear bearing assembly beyond the edge of the protective belt; and a platform mounted to the support means.

2. The apparatus of claim 1 in which the mechanical platform comprises a second linear bearing assembly.

3. A gantry robot comprising:

first and second parallel linear bearing assemblies, each including a block, a rail, and a plurality of bearings, the rails having a travel length;

a flexible belt placed over the linear bearing assemblies, the belt outer having edges parallel to the rails;

support means extending from each of the linear bearing assemblies and beyond the outer edges of the belt; and a mechanical platform mounted to the support means.

4. The apparatus of claim 3 in which the mechanical platform comprises third and fourth parallel linear bearing assemblies perpendicular to the rails of the first and second linear bearing assemblies.

* * * * *